United States Patent Office 3,262,285
Patented July 26, 1966

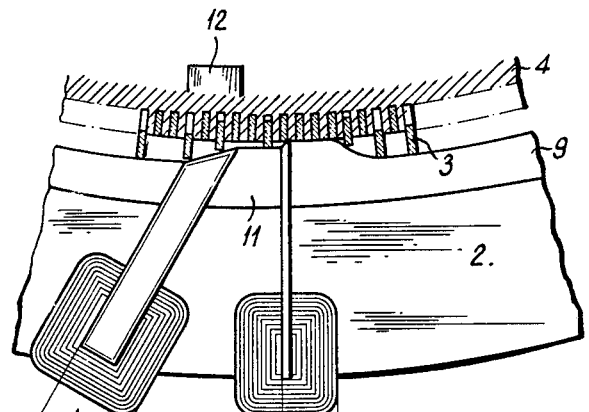
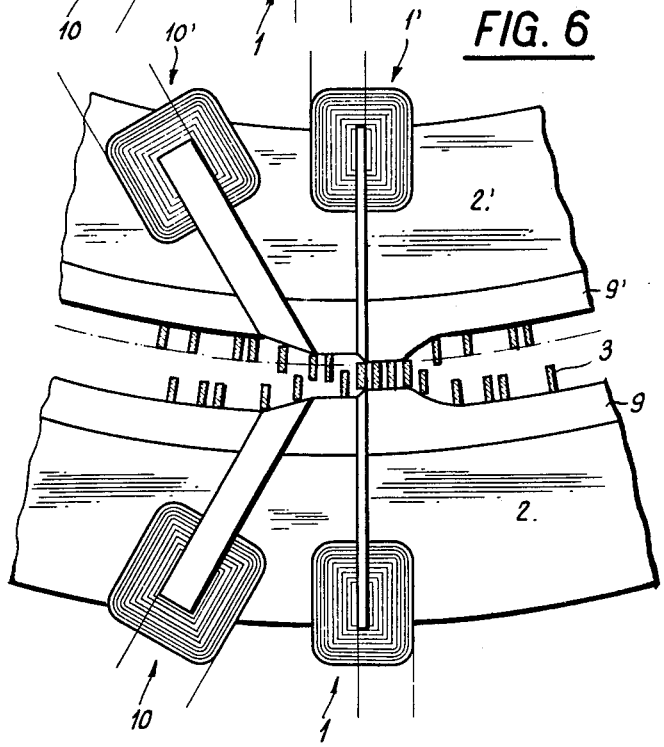

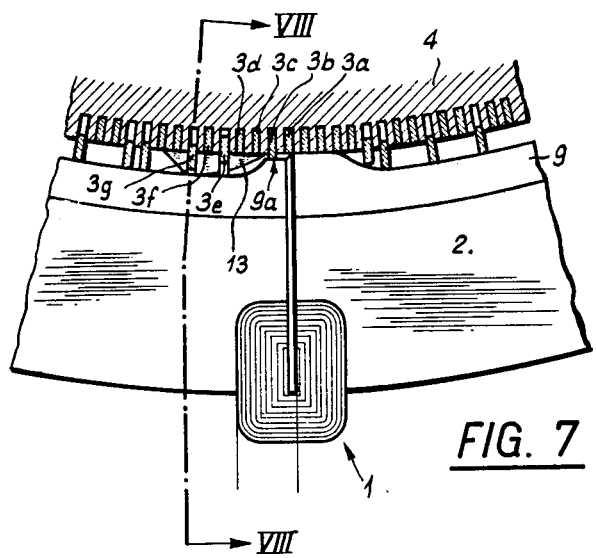
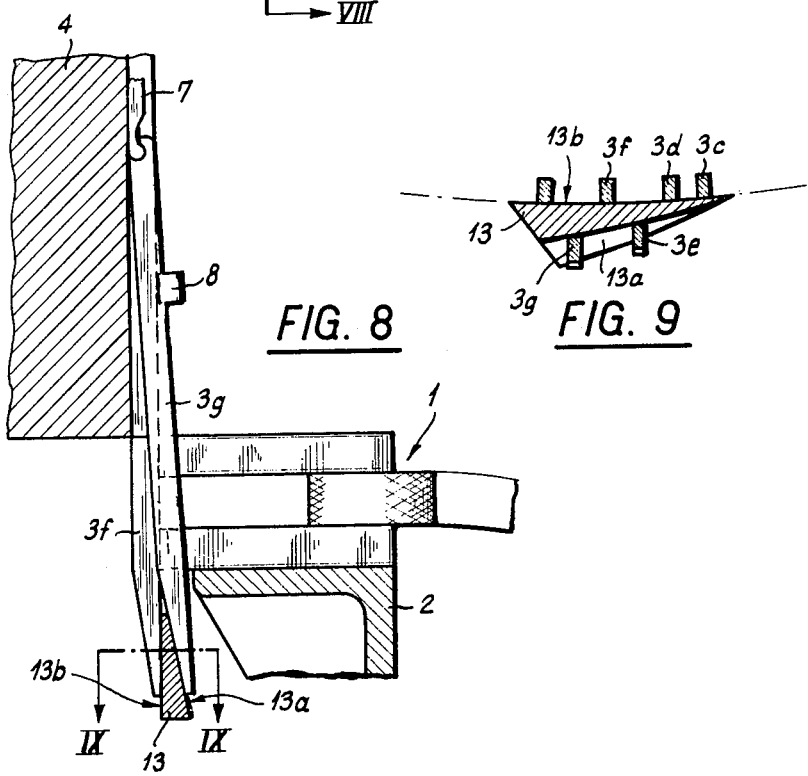

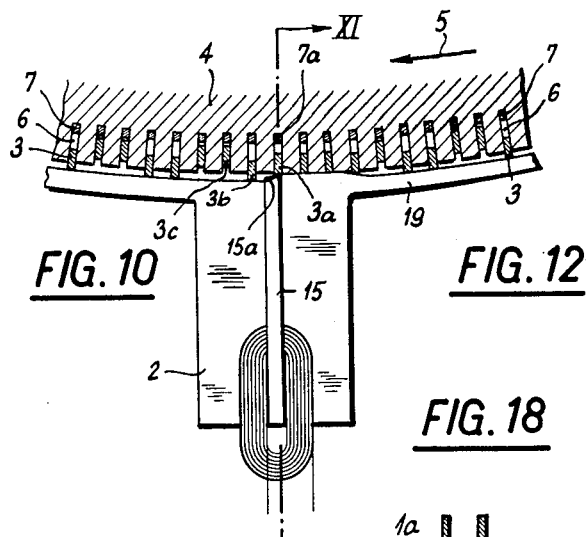
FIG. 10
FIG. 12
FIG. 18
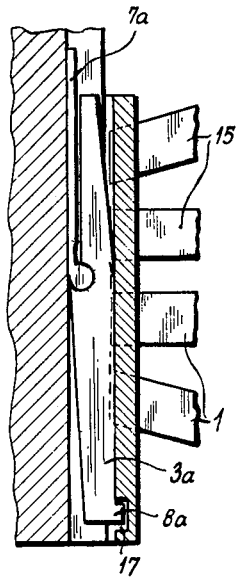
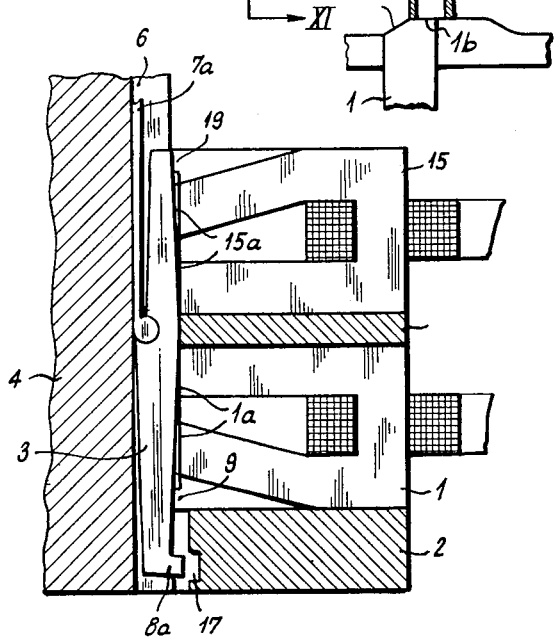
FIG. 11
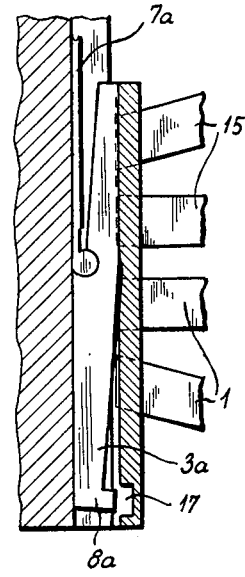
FIG. 13

3,262,285
ELECTROMAGNETIC NEEDLE SELECTION
MECHANISM
René Beguin, Chemin des Vignettes, Villette; André Corbaz, 20 bis Rte. de Drize, Carouge; and Serge Ramseier, 17 Ave. Vibert, all of Geneva, Switzerland
Filed July 9, 1963, Ser. No. 293,799
Claims priority, application Switzerland, July 11, 1962, 8,326/62; May 31, 1963, 6,820/63
12 Claims. (Cl. 66—50)

This invention relates to apparatus for selecting the needles of a knitting machine by the jacks, which each act on a needle.

The needles of a knitting machine are generally selected through the agency of jacks housed in grooves or slots in a part of the machine. Depending on the type of machine, the jacks move with respect to a selection mechanism, or vice versa.

Various types of selection mechanism are known. They vary with the type of the machine on the one hand and with the selection method used, on the other hand. They may be mechanical or electromechanical, the latter offering greater possibilities for automatic control of the machines.

Among the electromechanical mechanisms, the most advantageous are those based on the principle of electromagnetic holding, i.e., those which select the jacks while holding them in contact with the pole or poles of an electromagnet controlled by electrical pulses delivered in accordance with a given programme. The movement of a selected jack from one to the other of its two positions, the non-selected and the selected, is effected either by an appropriate guide system or by an inclination of the pole surface of the electromagnet poles.

The conventional method of selecting the needles by means of an electromagnetic holding mechanism comprises acting on a jack butt so as to move it in the direction of its axis, i.e., in the direction of movement of the needle it controls. This method has the disadvantage of limiting the contact area between the magnetic poles and the jack and the total area subject to the action of the electromagnetic field. This area is in fact limited to the jack butt area and hence in practice to the cross-section or profile of the jack which is generally very small for reasons dictated by the machine gauge. To increase the contact area it has been proposed to give the jack butt a special shape, but this is acceptable only in the case of large-gauge machines in which the distance between two adjacent jacks is sufficiently large. In small-gauge machines it is impossible.

The present invention obviates the above disadvantages in that magnetic poles are made to act on longitudinal jack edge portions so as to move the jack laterally edgewise.

The invention therefore comprises acting, by electromagnetic holding, on portions of an edge of a jack and not on a butt thereof. It is possible, with such an arrangement therefore, to act over any desired length of the edge and hence increase the contact area as much as necessary. This obviously enables the thickness of the jacks and hence the machine gauge to be reduced as much as desired having regard to practical considerations.

In accordance with the present invention an electromagnet having a pole surface inclined and so disposed that the front or leading end of such surface can electromagnetically keep a side edge of each of the jacks successively when the electromagnet is energized, the rear or trailing end of the inclined pole surface determining on continued energization of the electromagnet a lateral position of the jack, and the latter positioning being permissible for each jack individually by having the width of the inclined surface of each of the poles in the direction of movement at the maximum equal to the distance between two successive jacks.

The invention will be described further, by way of example, with reference to the accompanying drawings which illustrate a number of embodiments of the apparatus of the invention, and in which:

FIG. 5 is a view similar to FIG. 1, but showing a third embodiment of the apparatus;

FIG. 6 is a view similar to FIG. 1, but showing a fourth embodiment of the apparatus;

FIG. 7 is yet another view similar to FIG. 1, but showing a fifth embodiment of the apparatus;

FIG. 8 is a section taken on the line VIII—VIII of FIG. 7;

FIG. 9 is a section taken on the line IX—IX of FIG. 8;

FIG. 10 is yet another view similar to FIG. 1, but showing a sixth embodiment of the apparatus;

FIG. 11 is a section taken on the line XI—XI of FIG. 10;

FIG. 12 is a view similar to FIG. 11, but showing the parts in different positions;

FIG. 13 is a view, similar to FIGS. 11 and 12, but showing the parts and yet another different position;

FIG. 18 is a fragmentary enlarged plan view to illustrate a possible modified shape of the operative surfaces of the electromagnets.

Figure 1:
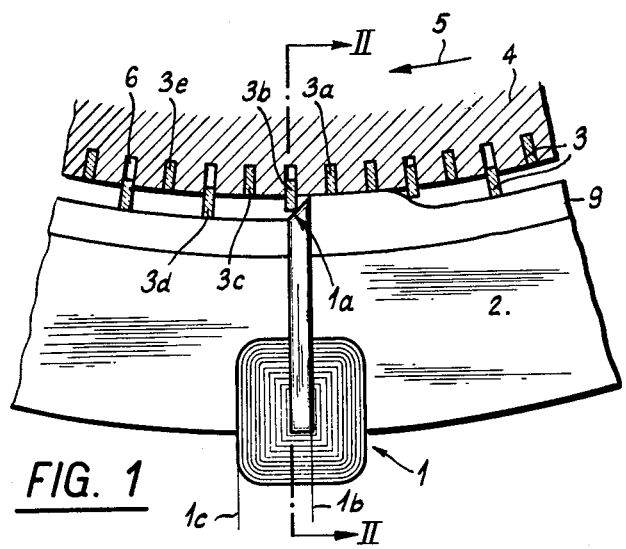
FIG. 1 is a diagrammatic fragmentary part-sectional plan view of a first embodiment of the apparatus, the figure showing a part of the cylinder containing the jacks and needles in cross-section.
Figure 2:
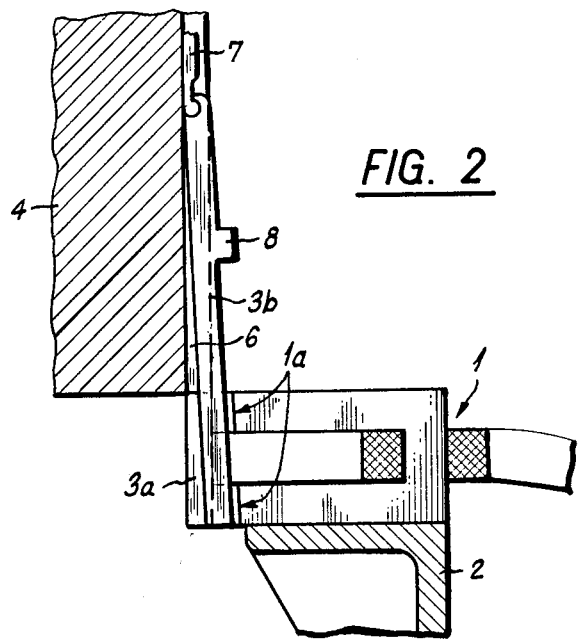
FIG. 2 is a section taken on the line II—II of FIG. 1.

Referring firstly to FIGS. 1 and 2, the selection mechanism illustrated therein comprises an electromagnet 1 fixed on a support 2 of nonmagnetic materal, for example brass, and registering with the bottoms of jacks 3 (see FIG. 2) carried by the needle cylinder 4 of a circular knitting machine, which cylinder 4 is adapted to rotate in the direction indicated by the arrow 5 of FIG. 1.

The cylinder 4 is formed, in known manner, with vertical grooves or slots 6 in which the jacks 3 are accommodated for both axial and radial movement. The top end of each of the jacks 3 is pivotally connected to the bottom end of a respective needle 7 (see FIG. 2) so that any axial movement of a jack 3 produces an axial movement of the corresponding needle 7. Each jacket 3 comprises a butt 8 intended for co-operation with a machine element, for example a lifting cam intended to produce an axial movement (i.e., raising and lowering in a direction parallel to the axis of the cylinder 4) of the jacks 3 when they are in the selected positions, i.e., the operative position which, in this embodiment, corresponds to the jack 3 being pivoted laterally to a position protruding from the groove or slot 6. In FIG. 2 the jack 3b is shown in the selected position.

A guide 9 disposed concentrically with the cylinder 4 returns all the selected jacks to their inoperative positions, i.e., disposed wholly within the respective grooves or slots 6, in known manner. In this way all of the jacks 3 moving with respect to the selection mechanism are brought to their nonselected positions upon each rotation of the needle cylinder.

The poles of the electromagnet 1 have pole surfaces 1a inclined away from the needle cylinder 4 in the direction of movement of the jacks 3. The electromagnet 1 is so disposed that the front or leading end of each inclined pole surface 1a contacts with each of the jacks 3 when it registers therewith. The pole surfaces 1a extend as far as and abut the guide 9, the rear or extreme end being at the level of such guide 9.

The width of each inclined pole surface 1a of the electromagnet 1 (i.e., considered in the direction of movement of the jacks 3 relative to the poles of the electromagnet) must, at the maximum, be equal to the distance between any two successive jacks 3 in order to prevent the inclined pole surface from coming simultaneously into contact with two adjacent jacks 3.

The two ends 1b and 1c of the winding of the electromagnet 1 are intended for connection to a source delivering control pulses to the electromagnet 1 in accordance with a given programme.

The selection mechanism as so far described and illustrated operates as follows:

With the cylinder 4 rotating in the direction of the arrow 5, all the jacks 3 come successively into contact with the front or leading ends of each of the inclined pole surfaces 1a, whilst such jacks are in their nonselected positions, having been brought there by the guide 9, see particularly the jack 3a in FIG. 1. If the jack 3a is not to be selected, i.e., not brought into the operative position for selection of the corresponding needle, no pulse is applied to the winding of the electromagnet 1 and hence it will not be subjected to any electromagnetic attraction. It will therefore remain in the nonselected position as in the case of the jacks 3c and 3e.

If, on the other hand, the jack 3a is to be selected, i.e., brought into the operative position, a control pulse is applied to the winding of the electromagnet 1, whose resultant electromagnetic attraction compels the jack 3a to remain in contact with the inclined pole surface 1a, as is exemplified by the jack 3b, until it arrives at the bottom or trailing end of the said surface 1a, whereupon it follows the guide 9 as in the case of the jack 3d. Each selected jack is held in its selected position by frictional engagement with the walls of the groove or slot 6, until it is engaged by the usual lifting and lowering cams of the knitting machine. Eventually, each selected jack is returned to the nonselected position by the guide 9 of a next subsequent selection station.

The electromagnet poles co-operate with the confronting edge of each of the jacks, over a distance to a considerable extent as compared with prior known constructions and the same applies to the total area subject to the action of the electromagnetic field. The electromagnetic force can be reduced, because it needs to be sufficient only to pivot the jack by acting on a lever arm the width of which can be made as large as possible having regard to space limitations, the movement of each selected jack and the needle it controls being effected by other means.

In a variant, the electromagnet 1 may comprise a second winding in opposition to the first winding and adapted to erase any residual magnetism in the electromagnet and in the jacks. Such second winding may be energised either by a D.C. voltage source producing a field sufficient to erase the residual magnetism, or by control pulses applied thereto when such pulses are not being applied to the first winding of the electromagnet.

Having regard to the fact that the maximum admissible width or thickness of the inclined poles must not exceed the distance between any adjacent pair of the jacks 3, and that there is a practical limit upon the maximum inclination of the inclined surfaces 1a of the poles, a single electromagnet may not be enough to displace the jacks 3 from the nonselected positions to the selected positions with certain spacings of the jacks, and in this case a second electromagnet may be provided as a booster.

Figure 3:
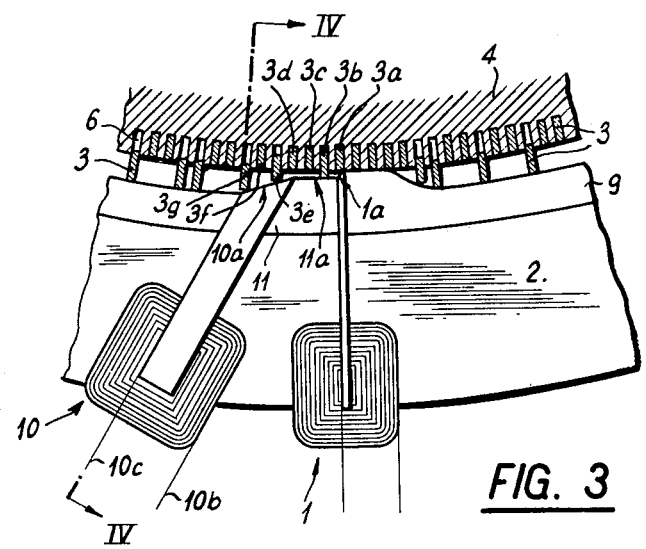
FIG. 3 is a view similar to FIG. 1, but showing a second embodiment of the apparatus.
Figure 4:
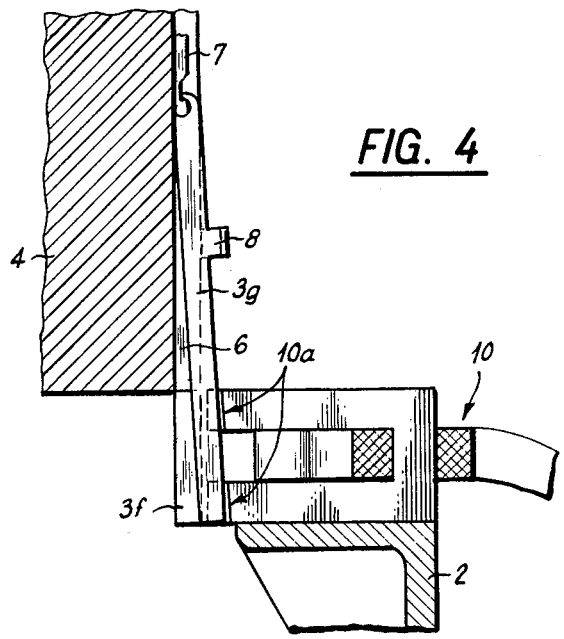
FIG. 4 is a section taken on the line IV—IV of FIG. 3.

FIGS. 3 and 4 show such an embodiment of the mechanism, which comprises a second electromagnet 10 fixed to the support 2 at a position following the electromagnet 1 in relation to the direction of movement of the jacks 3. The poles of the second electromagnet 10 also have pole surfaces 10a inclined away from the cylinder 4 in the direction of movement of the jacks 3. The electromagnet 10 is situated a distance from the electromagnet 1 in such manner that the front end or tip of the pole surface 10a is at the level of the rear end of the surface 1a being contiguous with surface 11a of a spacer 11 of nonmagnetic material, for example brass. The pole surface 10a extends as far as the guide 9, its rear or trailing end being at the level of the latter. Ends 10b and 10c of the electromagnet winding 10 are intended for connection to a D.C. source.

This mechanism operates as follows:

With the cylinder 4 rotating in the direction of the arrow 5, all the jacks 3 successively come into contact with the front or leading end of the inclined pole surface 1a in their nonselected position, see particularly the jack 3a in FIG. 3. If the jack 3a is not to be selected, no pulse is applied to the winding of the electromagnet 1 and hence it will not be subjected to any electromagnetic attraction. It will therefore remain in the nonselected position as is the case with the jacks 3c, 3d and 3f, the electromagnetic attraction of the electromagnet 10 not being sufficient to overcome the reluctance of the gap between the pole surface 10a and such jacks, and the friction of the latter in their grooves or slots.

If, on the other hand, the jack 3a is to be selected, a control pulse is applied to the winding of the electromagnet 1, whose resultant electromagnetic attraction compels the jack 3a to remain in contact with the pole surface 1a until it arrives at the bottom or trailing end of the latter, after which it follows the surface 11a of the spacer 11 as in the case of the jack 3b. It is held in this position by the friction of the groove or slot 6 until it arrives at the front end or tip of the pole surface 10a with which it is compelled to remain in contact because of the attraction exerted by the electromagnet 10, as is the case with the jacks 3e and 3g. When such jack arrives at the bottom or trailing end of the surface 10a, i.e., in the selected position, it remains in such selected position until taken over by the lifting and lowering cams of the knitting station. Each selected jack is then returned to the nonselected position by the guide 9 of the next successive selection station.

Alternatively the electromagnet 10 is replaced by a permanent magnet.

Having regard to the fact that there is, in practice, a maximum tolerable inclination for the inclined pole surfaces 1a, and that the distance between the poles of the second electromagnet 10 and the nonselected jacks must be sufficient to ensure that such nonselected jacks are not attracted, so that there should be no risk of accidental attraction of these jacks, a plurality of electromagnets of the same type as the electromagnet 1 may be provided in cascade between the electromagnets 1 and 10.

Accidental attraction of nonselected jacks by the electromagnet 10 could also arise from variations in the friction of the jacks in their grooves or slots, as a result of wear or manufacturing tolerances. This accidental attraction can also be eliminated by use of the embodiment of the mechanism shown in FIG. 5. In this, a permanent magnet 12 is situated at the side of the jacks 3 remote from the electromagnets 1 and 10 so as to be slightly in advance of the electromagnet 10. This magnet 12, which is practically in contact with the nonselected jacks 3, is intended to hold the latter in their slots or grooves and thus prevent their accidental attraction by the electromagnet 10. The magnet 12 could, of course, be replaced by an electromagnet.

When the movement to be performed by the jacks 3 between the selected and nonselected positions is a considerable movement, the arrangement may be such that all of the jacks are brought to an intermediate position from which the jacks are subsequently moved either into the selected or nonselected position as required. An embodiment of this kind is shown in FIG. 6.

It will be seen that the selection mechanism is composed of two mechanisms identical to that shown in FIG. 3 and disposed one opposite the other, one on each side of the jacks 3. Electromagnets 1' and 10' mounted on a support 2' are respectively situated opposite the electromagnets 1 and 10. Two guides 9 and 9' bring the jacks 3 from their selected and nonselected positions into an intermediate position between the diverging inclined surfaces of the poles of the electromagnets 1 and 1' from which the jacks are returned into the selected or nonselected position depending on which of the electromagnets 1, 10 or 1', 10' is energised.

It will readily be seen that this embodiment enables the distance between the selected and nonselected positions of the jacks to be doubled as compared by the previous embodiments while retaining the same dimensions for the electromagnets. Moreover, any residual magnetism in the jacks due to the electromagnet 1 is erased by the electromagnet 1' and vice versa. Any accidental attraction of the nonselected jacks by the electromagnet 10 is prevented by the action of the electromagnet 10'.

It therefore follows that the mechanism shown in FIG. 6 combines the advantages obtained if a second winding is provided for the electromagnet 1 to erase the residual magnetism in the jacks, with the advantages of the variant employing a plurality of cascade-connected electromagnets, and of the variant shown in FIG. 5.

This embodiment of the mechanism could, of course, in a modification, comprise just the magnets 1 and 1', for example when the spacing between adjacent pair of jacks is sufficient, so that it is possible to dispense with the additional electromagnets 10, 10' as is the case with the mechanism shown in FIG. 1.

FIGS. 7 to 9 show a variant of the mechanism shown in FIGS. 3 and 4.

In this case, the electromagnet 10 is replaced by a ramp 13 which serves to amplify any selecting movement applied to a jack 3 by the electromagnet 1. A jack 3 preselected by the electromagnet 1, is guided by surface 9a of the guide 9 to the ramp 13 so that its bottom part or foot is situated in front of the front end of inclined surface 13a of the ramp 13, as in the case of the jack 3b (FIG. 7). The surface 13a is so designed as to displace the preselected jack 3b into the fully selected position, as is the case with the jack 3g. The nonpreselected jacks are aligned with surface 13b of the ramp 13, so that they remain in the nonselected positions as they move along the ramp 13, as is the case with the jacks 3c, 3d and 3f.

This variant of the mechanism entails a special shape for the bottom part or foot of each of the jacks 3 (see FIG. 8). FIGS. 10 to 13 show another embodiment of the mechanism according to the invention, which has advantages in common with the embodiment shown in FIG. 6.

Referring to FIG. 11, the mechanism comprises a second electromagnet 15 identical to a first electromagnet 1 and mounted above the latter on a spacer 16 of nonmagnetic material, for example brass, so that it is situated on the same side of the jacks 3 in a position symmetrical with respect to the position of the first electromagnet 1 in relation to a plane substantially perpendicular to the jacks 3 and passing through the pivots of such jacks 3. This second electromagnet 15 is intended to cooperate with that part of each of the jacks 3 which is extended above the pivotal connection with the corresponding needle 7, and each jack 3 extends from the respective pivot so that such pivot is situated approximately midway along the length of the jack 3 in the illustrated case. Butts 8a intended to cooperate with lifting and lowering cams in known manner are provided at the bottom ends of the jacks. Support 2 comprises a groove or slot 17 for cooperation with the butts 8a of the jacks 3 as will be explained hereinafter.

Guides 9 and 19 situated respectively beneath and above the electromagnets 1 and 15 serve to return each of the jacks in front of the electromagnets 1 and 15 into the position shown in FIG. 11, in which position each jack is in contact with the front ends or tips of the inclined pole surfaces 1a and 15a of the electromagnets 1 and 15.

The above-described mechanism operates as follows:

When the cylinder 4 is rotating in the direction of the arrow 5, all the jacks 3 are brought by the guides 9 and 19 into the position occupied by the jacks 3a and the next two jacks (FIG. 10) in the drawing, this being an intermediate position between the selected (operative) and nonselected (inoperative) positions of the jacks. If the jack in front of the electromagnets (in this case the jack 3a) is to be selected, i.e., brought into the operative position for selection of the corresponding needle 7a, an electric pulse is applied to the winding of the electromagnet 1, whose resultant electromagnetic force will compel the jack 3 to remain in contact with the inclined pole surfaces 1a until it arrives at the bottom or trailing end of the latter. The jack 3a will consequently perform a rotary movement, laterally of the jack, about the point of pivotal connection with the needle 7a in the anticlockwise direction, and will assume the position shown in FIG. 12, this being the position occupied by the jack 3c in FIG. 10. The butt 8a of the jack 3c engages in the groove or slot 17 of the support 2, where it will be engaged by the lifting and lowering cams in known manner at the knitting station.

If, on the other hand, the jack 3a is not to be selected, i.e., is not to be brought into the operative position but into the inoperative position, the needle 7a remaining inoperative, an electric pulse is applied to the winding of the electromagnet 15 to compel the jack 3a to remain in contact with the inclined pole surfaces 15a of the electromagnet 15 until it reaches the bottom of such surfaces. The jack 3a will consequently pivot in the clockwise direction and assume the position shown in FIG. 13, which position is occupied by the jack 3b in FIG. 1. Its butt 8a will therefore remain outside the groove or slot 17 as shown in FIG. 13 and hence outside the lifting and lowering cams of the knitting station.

It will be apparent from the foregoing that the jacks 3 arrive at the selection mechanism in an intermediate position from which they are brought, by selective magnetic attraction against the inclined pole surfaces of the electromagnets, either into the selected position by means of the electromagnet 1 or into the nonselected position by means of the electromagnet 15. The jacks which are not to be selected are, therefore, also subject to the action of electromagnetic force so that any accidental selection as a result of the previously-mentioned reasons is impossible. Moreover, for a given spacing between adjacent jacks, it is possible to halve the inclination of the pole surfaces of the electromagnets while maintaining the same distance between the selected and nonselected positions of the jacks.

Figure 14:
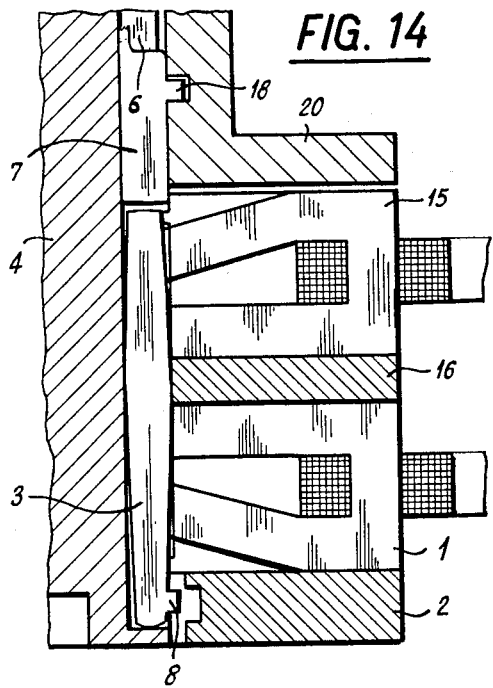
FIG. 14 is a view similar to FIG. 1, but showing a seventh embodiment of the invention.

In the embodiment of the mechanism described above, the jacks acting on the needles for the selection of the latter are each pivotally connected to the needles they control. The jacks could, of course, be separate from the needles 7. A variant of this kind is shown in FIG. 14.

In this embodiment, the central part of each jack 3, which central part is slightly wider than the end parts, of the jack 3, bears on the one hand against the bottom or inner surface of the groove or slot 6 and on the other hand against the spacer 16 so as to be pivotable about an imaginary axis perpendicular to its plane. The jacks 3 are brought into the selected and nonselected positions as explained hereinbefore but since they are separate from the needles 7 they cannot return the latter from the operative to the inoperative positions. To this end, each needle is provided with a respective butt 18 acted upon by a cam 20 which serves to bring the needles successively into the inoperative position, after having been brought into the operative position by the corresponding jack 3.

The advantage of this variant is that each needle 7 is not obstructed by the respective jack 3 during knitting. Moreover, the jacks 3 can be relowered and prepared for selection while the corresponding needles are knitting.

In all the embodiments and variants of the mechanism as described above, the inclined pole surfaces of the electromagnets cooperating with the jacks must be slightly helical surfaces because the jacks simultaneously perform a rotary movement and a translatory movement.

Figure 16:
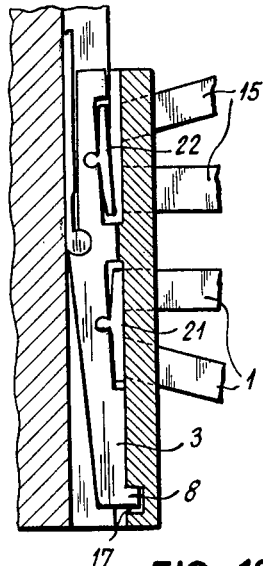
FIG. 16 is a view, similar to FIG. 15, but showing the parts in different positions.
Figure 15:
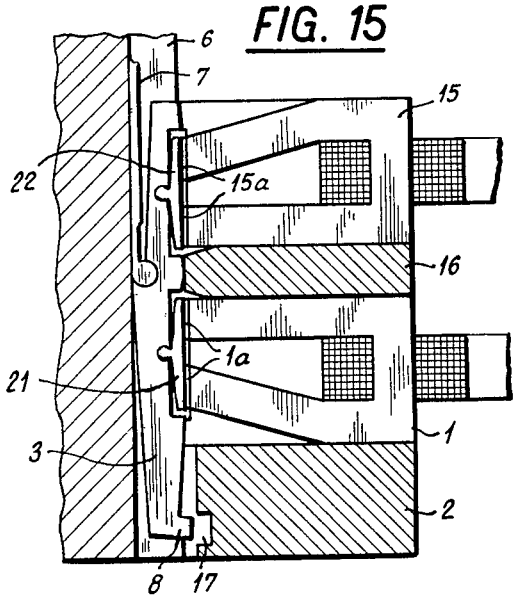
FIG. 15 is a view, similar to FIG. 14, but showing an eighth embodiment of the invention.
Figure 17:
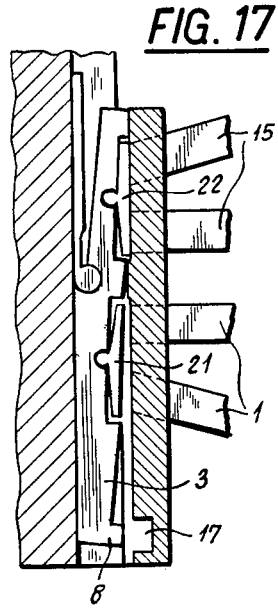
FIG. 17 is a view, similar to FIGS. 14 and 15, but showing the parts in yet further different positions.

FIGS. 15 to 17 show a variant of the mechanism according to the invention, more particularly of the embodiment shown in FIGS. 10 to 13, wherein the inclined pole surfaces are not helical. This is possible because of a modification to the jacks 3, such modification involving forming those parts of each of the jacks 3 whose face is intended for cooperation with the inclined pole surfaces of the electromagnets 1 and 15, in such manner as to be pivotable about axes perpendicular to the plane of the jack. To this end, each jack 3 is provided with two rockers 21 and 22 intended respectively for cooperation with the pole surfaces of the electromagnets 1 and 15. Each of the rockers 21, 22 therefore constitutes a part adapted to rock in the plane of the jack.

FIGS. 16 and 17, respectively, show the selected and nonselected positions of the jack 3. They show the positions of the rockers 21 and 22 at the bottoms of the inclined pole surfaces, these positions differing from those shown in FIG. 15, such difference being due to pivotal movement of the jack from the FIG. 15 position to the selected position.

As already explained hereinbefore, the width of the inclined pole surface in the direction of movement of the jacks must not exceed the distance between two successive jacks, in order that the selection of the preceding jack may be completed at the time when the next jack comes into the range of the electromagnet poles. However, the total width of each of the poles could be larger, i.e., each pole could be shaped to provide a preliminary magnetic flat keeper surface, in front of the inclined surface, for engagement by the jacks 3.

FIG. 18 is a plan view of such a pole, whose pole surface comprises a flat part 1b and an inclined part 1a. The advantage of this variant is that the jacks may actually be magnetically kept in contact with the poles of the electromagnets before reaching the leading ends of their inclined surfaces. In fact, for various reasons (such as manufacturing tolerances or wear) in the preceding embodiments the jacks successively reaching the leading ends of the pole inclined surfaces may be in contact with neither of the latter and this would result in a gap which has to be overcome by the electromagnetic attraction.

We claim:

1. A knitting machine comprising a plurality of needles and a mobily mounted longitudinally edged jack associated with each of said needles for said jack to be advanced and by selection be deflected laterally edgewise of the jack toward a position corresponding to selection of the associated needle, and a needle selecting mechanism comprising at least one electromagnet having poles and an energizable winding for deflecting those of said jacks whose needles are to be selected, said poles being arranged and having inclined surfaces divergent from the path of advance of the jacks for a longitudinally edged portion, of each of said jacks successively in advancing past said electromagnet, to pass adjacent to leading ends of said poles and, when said winding is energized, for said longitudinally edged portion of the laterally mobile advancing jack to be magnetically engaged with said leading ends of said poles and move the jack magnetically attracted toward said inclined surfaces, whereby said jack is displaced laterally edgewise of the jack by selection toward said position corresponding to selection of the associated needle.

2. A knitting machine as set forth in claim 1, in which in addition to said winding as a first winding, said electromagnet comprises an energizable second winding to erase any residual magnetism in said electromagnet when said first winding is not energized.

3. A knitting machine as set forth in claim 1, comprising means disposed after said electromagnet along the path of advance of said jacks and constructed for further displacing, toward said position corresponding to selection of the associated needle, those of said jacks which have been displaced by said electromagnet.

4. A knitting machine as set forth in claim 3, in which said means comprise a magnet arranged after said electromagnet and comprising second poles having respective inclined surfaces past which those of said jacks which have been displaced by said electromagnet move in close proximity, such that said jacks are further displaced by magnetic holding by said second poles through passing said second poles, the further displacement being toward said position corresponding to selection of the associated needle.

5. A knitting machine as set forth in claim 4, in which a spacer of non-magnetic material extends from the trailing ends of said poles of said electromagnet to the leading ends of said second poles.

6. A knitting machine as set forth in claim 5, comprising a further magnet facing said magnet arranged after said electromagnet and disposed on the opposite side of said jacks so as to retain the non-selected jacks from attraction by said magnet arranged after said electromagnet.

7. A knitting machine as set forth in claim 1, comprising a ramp arranged to be engaged by and further displace, toward said position corresponding to selection of the associated needle, those of said jacks displaced by said electromagnet.

8. A knitting machine as set forth in claim 1, in which said needle selecting mechanism comprises a pair of opposed electromagnets having inclined pole surfaces past which said jacks are arranged to be moved, said inclined surfaces of each of said electromagnets diverging from said inclined surfaces of the other of said electromagnets and from the path of movement of said jacks on opposite sides of said path, and a winding for each of said electromagnets, said windings being selectively energizable for said electromagnets to displace said jacks in opposite directions laterally of the jack toward positions respectively corresponding to selection of the associated needle and to non-selection of the associated needle.

9. A knitting machine as set forth in claim 8, comprising means arranged after each of said electromagnets and constructed for further displacing said jacks in said opposite directions.

10. A knitting machine as set forth in claim 1, wherein said jacks have first and second edged portions extending longitudinally of the jack on the same side of the jack and each of said jacks are pivotally supported intermediate said first and second edged portions, and said needle selecting mechanism comprises first and second electromagnets having poles and inclined surfaces of the poles, there being a winding in each of said electromagnets for selectively either of said electromagnets to be energized and said poles being arranged for said first and second edged portions of the jack concurrently to pass adjacent to leading ends of said electromagnets respectively and, upon energization of said winding of selectively said first and second electromagnet, for said longitudinally edged portion of the laterally mobile jack advancing past said energized electromagnet to be magnetically engaged with said leading ends of said poles of the energized electromagnet and move the jack magnetically attracted toward said inclined surfaces of the poles of said energized electromagnet, whereby said jack is displaced laterally edgewise of the jack selectively either pivotally directionally toward a position corresponding to selection of the associated needle or oppositely pivotally directionally toward a position corresponding to non-selection of the associated needle.

11. A knitting machine as set forth in claim 10, in which said edged portions of each jack are each pivotally connected in the respective jack to allow said edged portion to pivot around an axis perpendicular to the plane of the jack.

12. A knitting machine as set forth in claim 1, in which a said pole of said electromagnet comprises a preliminary portion of the pole immediately preceding said inclined surface so as to preliminarily keep said edged portion of said jack passing said electromagnet to said electromagnet when said winding is energized.

References Cited by the Examiner
UNITED STATES PATENTS

| | | | |
|---|---|---|---|
| 1,795,235 | 3/1931 | Ruinnet | 66—154 |
| 2,157,989 | 5/1939 | Lawson | 66—75 |
| 2,173,488 | 9/1939 | Tandler et al. | 66—75 |
| 3,079,775 | 3/1963 | Schaeder et al. | 66—50 |

FOREIGN PATENTS 883,432 11/1961 Great Britain.

DONALD W. PARKER, *Primary Examiner.*
R. FELDBAUM, *Assistant Examiner.*